United States Patent [19]

Douglas et al.

[11] Patent Number: 4,557,906

[45] Date of Patent: Dec. 10, 1985

[54] RECOVERY OF RHENIUM

[75] Inventors: Alan D. Douglas; Kenneth T. Reilly, both of Towanda; John E. Landmesser, Monroeton, all of Pa.

[73] Assignee: GTE Products Corporation, Stamford, Conn.

[21] Appl. No.: 669,125

[22] Filed: Nov. 7, 1984

[51] Int. Cl.⁴ .................. C01G 47/00; C01G 41/00
[52] U.S. Cl. ................................. 423/49; 423/54; 75/101 BE
[58] Field of Search ............... 423/49, 54; 75/101 BE

[56] References Cited

U.S. PATENT DOCUMENTS

| | | | |
|---|---|---|---|
| 2,187,750 | 1/1940 | Marvin | 423/53 |
| 2,945,743 | 7/1960 | Zimmerley et al. | 423/54 |
| 3,672,874 | 6/1972 | Wiley | 75/101 BE |

FOREIGN PATENT DOCUMENTS 163359  1/1967  U.S.S.R. .................. 423/49

Primary Examiner—H. T. Carter
Attorney, Agent, or Firm—Robert E. Walter

[57] ABSTRACT

In a process for recovering rhenium, a starting material containing tungsten and rhenium is reacted with sodium hydroxide and an oxidizing reactant to form a fused solid. The fused solid is dissolved in water to solubilize the tungsten and rhenium values and then pass through an anion exchange resin to remove the rhenium values and form a solution containing the tungsten values. The resin is stripped to obtain the rhenium values from the resin.

1 Claim, No Drawings

RECOVERY OF RHENIUM

This invention relates to a process for recovering rhenium from tungsten and rhenium bearing material.

BACKGROUND OF THE INVENTION

A previous method for recovering rhenium from material containing tungsten and rhenium such as scrap wire involves heating the scrap in air to a temperature at which both tungsten and rhenium are oxidized. Rhenium heptoxide, being volatile, sublimes from the tungsten oxide and is collected in a cooler portion of the furnace system. The rhenium is then removed by dissolution in water to form soluble perrhenic acid which can be processed chemically to other desired rhenium compounds.

A disadvantage of this method is a low recovery efficiency of contained rhenium. Substantial amounts of rhenium remain with the tungsten. Another disadvantage is the need for a capital investment in a furnace to carry out the oxidizing, subliming, and condensing steps.

SUMMARY OF THE INVENTION

In accordance with the present invention, there is provided a process for recovering rhenium from tungsten and rhenium bearing starting material comprising reacting the starting material with a mixture of sodium hydroxide and an oxidizing reactant to form a fused solid, dissolving the fused solid in water to solubilize the tungsten and rhenium values, contacting the solution containing the tungsten and rhenium values with a bed of a strongly basic anion exchange resin to absorb the major portion of the rhenium values and form a rhenium depleted solution comprising essentially all of the tungsten values, and stripping the retained rhenium values from the resin with a stripping acid to remove essentially all of the rhenium values from the resin and to form a solution comprising perrhenic acid.

DETAILED DESCRIPTION OF THE INVENTION

The starting material comprises tungsten and rhenium, such as metal alloys of tungsten and rhenium. The preferred material consists essentially of tungsten and rhenium such as tungsten-rhenium scrap wire, powder, or chunks with typical ranges of rhenium of from about 1 percent to about 10 percent by weight with about 3 to about 10 percent by weight being preferred. The balance is essentially all tungsten.

The starting source material is reacted with sodium hydroxide and an oxidizing reactant which is preferably sodium nitrate, sodium nitrite, sodium chlorate, or sodium peroxide to form a fused solid. The process of reacting the material by this oxidizing fusion is described in U.S. patent application Ser. No. 669,126, now U.S. Pat. No. 4,521,381, filed concurrently herewith. That application is hereby incorporated by reference.

The resulting material contains essentially all of the tungsten and rhenium in oxidized form as sodium tungstate and sodium perrhenate. Next, the fused material is dissolved in water to solubilize the tungsten and rhenium values. Under proper conditions typically employed to solubilize values from a solid. Insoluble residue is preferably removed by any standard technique such as filtration. The resulting solution is alkaline and is preferably of a pH of from about 10 to about 14. The solution generally contains from about 50 to about 150 grams per liter of tungsten and about 0.5 to about 15 grams per liter rhenium and can contain other impurities.

The resulting solution is then passed through a bed of a strongly basic anion exchange resin. The preferred resin is a styrene divinylbenzene copolymer lattice with a relatively high degree of cross-linking to which is attached quaternary ammonium exchange groups. The quaternary ammonium exchange groups contain an exchangeable anion usually chloride; but the anion can be also hydroxide, nitrate, sulfate, and the like. A preferred resin is supplied by Illinois Water Treatment Company under the name of IWT A 284. Another similar satisfactory resin is supplied by Dow Chemical Company under the name of Dowex 1-X8. The exchangeable anion of the resin is replaced by the anion of the solution passing through the resin bed, in this case by the perrhenate ion of the tungsten and rhenium bearing alkaline solution. The exchange capacity of strongly basic anion exchange resins of the type described above is generally from about 1.0 to about 1.4 milliequivalents of the anion per milliliter or resin. In the case of the perrhenate anion, the capacity is from about 0.183 to about 0.257 grams of rhenium per milliliter of resin. The perrhenate anion is selectively or preferentially exchanged over the tungstate anion under the solution conditions of very high pH and herein lies the basis for the tungsten-rhenium separation. The tungsten values pass through the resin. The resulting rhenium depleted solution or raffinate contains essentially all of the tungsten values and can be processed by conventional methods to recover the tungsten. The rhenium concentration in the raffinate is generally about 0.1 grams per liter. Generally from about 90 to about 100% and more typically from about 99% to about 99.5% of the rhenium is removed from the starting solution and retained on the resin. The resin can be washed with deionized water to remove any residual impurities without removing any rhenium.

Rhenium values are stripped from the resin by passing an acid solution through. Typical acids are nitric, sulfuric, hydrochloric, and perchloric acids. Especially preferred is nitric acid. Sulfuric and hydrochloric acids require greater volume of acid solution than nitric acid, and perchloric acid is potentially hazardous. The concentration of the acid can vary depending on the particular acid used. If the acid concentration is too low, recovery of the rhenium is less efficient. On the other hand, too high an acid concentration can result in chemical breakdown of the resin. When nitric acid is used as the stripping agent, about a 4 Normal concentration is sufficient to strip the rhenium efficiently without breaking down the resin. In this case, the nitrate anion of the stripping acid is exchanged for the perhennate anion on the resin. The perrhenate anion goes into solution in the acid environment as perrhenic acid. The stripping step may also regenerate the resin with the anion of the stripping acid now becoming the exchangeable anion of the resin.

Generally, when 4 Normal nitric acid is used as the stripping agent, from about 75% to about 90% of the rhenium is stripped from a loaded resin and the solution containing rhenium values typically comprising from about 20 to about 40 grams of rhenium per liter. The generated resin can be reused in a continuous operation.

To more fully illustrate this invention, the following example is presented. All parts, portions, and percentages are by weight unless otherwise stated.

The fusion of tungsten-rhenium scrap material with sodium hydroxide and sodium nitrite is carried out followed by dissolution in water and filtration to remove insolubles, to produce an alkaline sodium tungstate-sodium perrhenate solution. An ion exchange column is set up with about 10 milliliters of IWT A 284 resin. About 0.75 liters of the sodium tungstate-sodium perrhenate solution containing about 82.5 parts of tungsten and about 2.70 parts of rhenium is passed through the column and the resin at an average rate of about 2.9 milliliters per minute. The first approximately 0.455 liters which passes through the resin has substantially all the rhenium values removed. Rhenium is less than about 0.05 grams per liter in the remaining solution after contacting the resin. Essentially all of the tungsten which is present in the starting solution is present. About 98.6% of the rhenium that was in the 0.455 liters is retained on the column. About 95.2 percent of the rhenium from the remainder of the 0.75 liters is retained on the column. A volume of about 0.15 liters of deionized water is then passed through the resin to rinse out any tungstate and hydroxide ions from the resin. A volume of about 0.20 liters of about 4 Normal nitric acid is then passed through the resin at an average rate of about 0.45 milliliters per minute. The average concentration in the first 0.15 liters through the resin is about 15.5 parts of rhenium per liter or at a total of about 2.334 grams of rhenium removed from the resin or about 90.8% of the rhenium which was retained on the column. No tungsten is detected in the strip solution, the analysis being less than about 0.05 parts of tungsten per liter. Thus the ratio of rhenium to tungsten in the acid strip solution is greater than about 300 to 1. The rhenium not stripped off the column is not lost since the resin can be and is reused to exchange perrhenate anions from subsequent batches of feed solution which are stripped in continuous cycles.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering rhenium and tungsten values from a rhenium bearing material consisting of about 1 to about 10 percent by weight rhenium metal with a balance consisting essentially of tungsten metal, said process comprising: (a) reacting said rhenium bearing material with a mixture of sodium hydroxide and an oxidizing reactant selected from the group consisting of sodium nitrate, sodium nitrite, sodium chlorate, sodium peroxide and mixtures thereof to form a fused solid comprising sodium tungstate and sodium perrhenate, (b) dissolving said fused solid in the water under conditions suitable to form a solution having a pH of from about 10 to about 14 comprising sodium tungstate in an amount from about 50 to about 150 grams per liter based on the weight of tungsten and sodium perrhenate in an amount from about 0.5 to about 15 grams per liter based on the weight of rhenium, contacting said solution with a bed of a strongly basic anion exchange resin to absorb the major portion of the rhenium values and form a rhenium depleted solution comprising substantially all of the tungsten values, (c) stripping the rhenium values from said resin with a nitric acid solution.

* * * * *